US009187148B2

(12) United States Patent  (10) Patent No.: US 9,187,148 B2
Jewell  (45) Date of Patent: Nov. 17, 2015

(54) DRIVE SYSTEM FOR A PEDALED VEHICLE (71) Applicant: Huffy Corporation, Centerville, OH (US)

(72) Inventor: Jason Jewell, Fairborn, OH (US)

(73) Assignee: HUFFY CORPORATION, Centerville, OH (US)

( * ) Notice: Subject to any disclaimer, the term of this patent is extended or adjusted under 35 U.S.C. 154(b) by 0 days.

(21) Appl. No.: 14/261,099

(22) Filed: Apr. 24, 2014

(65) Prior Publication Data

US 2014/0319798 A1 Oct. 30, 2014

Related U.S. Application Data (60) Provisional application No. 61/817,013, filed on Apr. 29, 2013.

(51) Int. Cl.
*B62M 9/02* (2006.01)
*F16H 7/06* (2006.01)

(52) U.S. Cl.
CPC ... *B62M 9/02* (2013.01); *F16H 7/06* (2013.01)

(58) Field of Classification Search
USPC ......... 280/284, 288, 210, 258, 260, 261, 262; 474/101, 111, 113, 114, 115, 116, 117, 474/49, 50, 52, 53, 54, 55, 56
See application file for complete search history.

(56) References Cited

U.S. PATENT DOCUMENTS

| 4,169,609 A | * | 10/1979 | Zampedro ..................... 280/241 |
| 4,427,209 A | * | 1/1984 | Morita ........................ 280/281.1 |
| 4,820,244 A | * | 4/1989 | Lander ............................ 474/56 |
| 4,946,426 A | * | 8/1990 | Leonard ........................ 474/101 |
| 4,973,289 A | * | 11/1990 | Leonard ......................... 474/49 |
| 5,006,094 A | * | 4/1991 | Leonard ........................ 474/101 |
| 5,104,357 A | * | 4/1992 | Leonard et al. ................. 474/49 |
| 5,984,814 A | * | 11/1999 | Davenport ...................... 474/50 |
| 6,474,669 B2 | | 11/2002 | Colwell |
| 7,104,562 B2 | | 9/2006 | Schmider |
| 7,413,206 B2 | | 8/2008 | Pena et al. |
| 7,955,205 B2 | | 6/2011 | Urabe |

(Continued)

FOREIGN PATENT DOCUMENTS

JP  2013001381 A  *  1/2013

OTHER PUBLICATIONS

International Searching Authority, International Search Report and Written Opinion issued in corresponding Application No. PCT/US2012/035663, dated Apr. 28, 2014, 12 pages.

*Primary Examiner* — Kevin Hurley
(74) *Attorney, Agent, or Firm* — Wood, Herron & Evans, LLP (57) ABSTRACT

A pedaled vehicle includes a frame having a crank for receiving a power input from a rider, a wheel rotatably coupled to the frame, and a drive system. The drive system includes a first sprocket operatively coupled to the crank, a second sprocket operatively coupled to the wheel, and a power transmitting element operatively coupled to the first and second sprockets for transmitting the power input from the rider at the crank to the wheel for moving the pedaled vehicle. The power transmitting element forms a closed-loop configuration and is arranged relative to the frame such that the power transmitting element is configured to be assembled to the vehicle or replaced on the vehicle without having to break the closed-loop configuration of the power transmitting element.

30 Claims, 4 Drawing Sheets

(56) References Cited

U.S. PATENT DOCUMENTS

| | | | |
|---|---|---|---|
| 2003/0224891 A1* | 12/2003 | Chou | 474/146 |
| 2005/0253356 A1* | 11/2005 | Matsueda et al. | 280/260 |
| 2010/0194182 A1* | 8/2010 | Katz | 301/109 |
| 2011/0316251 A1 | 12/2011 | Lumpkin | |
| 2012/0038130 A1 | 2/2012 | Wuthrich | |

* cited by examiner

DRIVE SYSTEM FOR A PEDALED VEHICLE

CROSS-REFERENCE TO RELATED APPLICATION

This application claims priority to U.S. Provisional Patent Application Ser. No. 61/817,013 filed Apr. 29, 2013, the disclosure of which is incorporated by reference herein in its entirety.

TECHNICAL FIELD

The invention relates to a drive system for a pedaled vehicle, and more particularly to a drive system for a bicycle having a power transmitting element which may be assembled to the bicycle or replaced on the bicycle without having to break or re-establish the closed-loop configuration of the power transmitting element.

BACKGROUND

Bicycles, tricycles and other pedaled vehicles are some of the most popular items with children and adults alike. Although such pedaled vehicles have been in existence for a very long time, these vehicles remain as popular and relevant today as in the past. Accordingly, manufacturers continue to strive to improve all aspects of these vehicles. By way of example, manufacturers continually strive to improve the assembly, maintenance, and aesthetics of pedaled vehicles.

Figure 1:
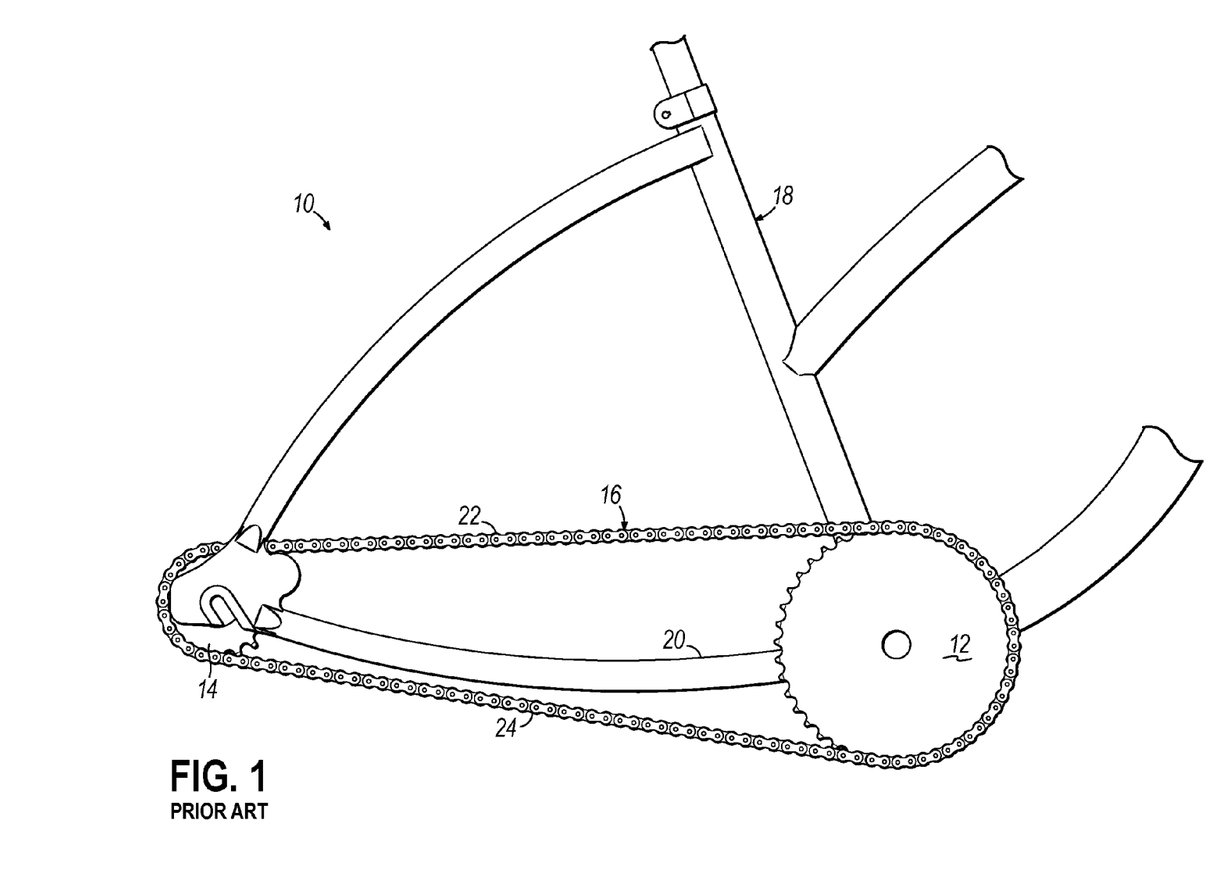
FIG. 1 is a side view of a conventional drive system for a bicycle.

For example, one aspect of current bicycle design for which improvement is sought is with the assembly and the replacement of the chain. FIG. 1 illustrates a conventional drive system for a bicycle 10 which includes a front sprocket 12 operatively coupled to a crank (not shown), a rear sprocket 14 operatively coupled to the rear wheel (not shown), and a chain 16 extending therebetween for transmitting the power from the rider acting on the crank to the rear wheel to thereby propel the bicycle 10 in a certain direction. As is illustrated in FIG. 1, it is generally known that the chain 16 forms a closed loop about the bicycle frame 18, such as chain stay 20, for example, such that the chain 16 cannot simply be removed from the bicycle 10 (even if the rear wheel is removed from the bicycle). In other words, some portion of the frame 18 is on the inside or interior of the closed-loop chain 16 that prevents the chain 16 from being assembled to or removed from the bicycle 10 in a closed-loop configuration. The inventor has noted that this is due to the fact that the rear sprocket 14 is generally on the inside of the frame 18 (e.g., between the two chain stays), the front sprocket 12 is generally on the outside of the frame 18, and the upper and lower portions 22, 24 of the chain 16 cross from outside the frame 18 to inside the frame 18 on opposite sides of the chain stay 20. More particularly, the lower portion 24 of the chain 16 crosses from outside the frame 18 to inside the frame 18 at a location generally below the chain stay 20 while the upper portion 22 of the chain 16 crosses from outside the frame 18 to inside the frame 18 at a location generally above the chain stay 20. This arrangement results in a closed loop configuration of the chain 16 about the chain stay 20.

In any event, the closed-loop configuration of the chain 16 around the frame 18 has several consequences. In regard to chain assembly, during the initial assembly process, a specified amount of chain is extracted from a chain roll or spool and cut to length. The chain is then wrapped around the front and rear sprockets and coupled together to form this closed-loop configuration. This chain assembly process is typically manual and is therefore labor intensive and costly. Secondly, as the process is not conducive to automation, there may be inconsistencies in chain length, which may result in quality assurance concerns.

In regard to chain replacement, the chain must be designed in a manner that allows the closed-loop configuration of the chain 16 to be selectively broken (e.g., so as to have two ends) and re-established. To this end, the chain 16 may include a master link (not shown), which is specially designed to allow the chain to be broken and re-established from a closed-loop configuration. However, the drawback to this design is that the master link represents a weak link in the chain which may operate as a potential failure site for chain breakage. Alternatively, the chain may include moveable link pins, one of which may be nearly removed (but preferably not completely removed) from the chain so as to release the chain from its closed-loop configuration. The drawbacks to this approach are that a special tool is required to disengage the selected link pin and that many consumers are simply unaware of this method of removing the chain. In any event, chain repair or replacement often results in a trip to a local bicycle shop, which may be inconvenient to the consumer and incur unwanted costs.

Current bicycle drive systems have additional drawbacks as well. For example, the lower portion 24 of the chain path may be close to or adjacent the riding surface of the bicycle (e.g., road, trail, track, etc.). Accordingly, due to the proximity of this portion of the chain to the riding surface, the chain 16 may pick up a significant amount of dirt, grease, or other debris that negatively impacts the performance of the chain 16, thereby potentially introducing power transmission losses. Furthermore, in some countries or regions, various regulations may require that a chain guard (not shown) be provided to cover at least a portion of the chain, such as the front sprocket 12 and the upper chain portion 22. Moreover, in certain countries or regions, regulations may require that the chain guard cover both the upper and lower chain portions. In current drive systems, wherein the upper and lower chain portions 22, 24 may be spaced apart by a significant amount, this may require relatively large chain guards, which may increase overall costs of the bicycle. Additionally, some believe that current drive systems are aesthetically flawed, appearing bulky and unwieldy due to the relatively large spacing between the upper and lower chain portions 22, 24 and the awkward, non-parallel lines the chain makes in combination with the frame 18.

Accordingly, there is a need for an improved drive system for a pedaled vehicle, such as a bicycle, that permits the chain or other power transmitting element to be assembled or replaced on the vehicle without breaking and/or re-establishing the closed-loop configuration of the element. There is also a need for an improved drive system that reduces the amount of debris exposed to the chain or power transmitting element, reduces the size of the chain guard, and provides enhanced aesthetics.

SUMMARY

A pedaled vehicle comprises a frame having a crank for receiving a power input from a rider, a wheel rotatably coupled to the frame, and a drive system. The drive system includes a first sprocket operatively coupled to the crank, a second sprocket operatively coupled to the wheel, and a power transmitting element operatively coupled to the first and second sprockets for transmitting the power input from the rider at the crank to the wheel for moving the pedaled vehicle. The power transmitting element forms a closed-loop configuration and is arranged relative to the frame such that the power transmitting element is configured to be assembled to the vehicle or replaced on the vehicle without having to break the closed-loop configuration of the power transmitting element. Thus, in one embodiment, the power transmitting element is coupled to the vehicle such that no portion of the frame is positioned on the inside of the closed-loop power transmitting element.

In exemplary embodiment, the first sprocket is coupled to the vehicle on the outside of the frame and the second sprocket is coupled to the vehicle on the inside of the frame. The power transmitting element defines a power transmitting element path having an upper element path and a lower element, wherein the upper and lower element paths cross from outside the frame to inside the frame on the same side relative to a selected portion of the frame. For example, in one embodiment, the upper and lower element paths cross from outside the frame to inside the frame above the chain stay. In this regard, the drive system may further include at least one idler wheel coupled to the frame and positioned between the first and second sprockets. The at least one idler wheel is configured to engage the power transmitting element such that the upper and lower element paths cross from outside the frame to inside the frame on the same side relative to the selected portion of the frame. In one embodiment, the power transmitting element engages the at least one idler wheel along the lower element path.

In an exemplary embodiment, the drive system includes two idler wheels, a first idler wheel positioned adjacent the first sprocket and a second idler wheel positioned adjacent the second sprocket. The first idler wheel may have a rotational center generally above a rotational center of the first sprocket and may be positioned within the first 20% of the distance between the first and second sprockets. Additionally, the first idler wheel may be adjustable relative to the frame, such as being spring biased, for example. In a similar manner, the second idler wheel may have a rotational center generally below a rotational center of the second sprocket and may be positioned within the last 20% of the distance between the first and second sprockets. Additionally, the second idler wheel may be adjustable relative to the frame, such as being spring biased.

In one embodiment, the power transmitting element extending between the first and second idler wheels defines a first element path portion on one of the upper or lower element paths, wherein the first element path portion is generally parallel to a second element path portion on the other of the upper or lower element paths. In one embodiment, the generally parallel first and second element path portions may extend for greater than about 50% of the distance between the first and second sprockets. Moreover, the generally parallel first and second element path portions may be arranged in a substantially horizontal orientation.

In accordance with an aspect of the invention, the first idler wheel may be positioned such that the power transmitting element engages the first sprocket over an angle greater than about 180°. For example, the power transmitting element may engage the first sprocket over an angle between about 185° and about 270°. Additionally, the second idler wheel may be positioned such that the power transmitting element engages the second sprocket over an angle greater than about 180°.

In an exemplary embodiment, the pedaled vehicle may include a bicycle and the wheel having the second sprocket may be a rear wheel of the bicycle. Furthermore, due to the ability to assemble or replace the power transmitting element without breaking the closed-loop configuration, the power transmitting element may include a chain or a belt.

In another embodiment, a bicycle includes a frame having a crank for receiving a power input from a rider and a frame member extending between the crank and a receiving member, a wheel rotatably coupled to the receiving member, and a drive system. The drive system includes a first sprocket operatively coupled to the crank, a second sprocket operatively coupled to the wheel, at least one idler wheel coupled to the frame between the first and second sprockets, and a power transmitting element operatively coupled to the first and second sprockets for transmitting the power input from the rider at the crank to the wheel for moving the powered vehicle. The power transmitting element engages the at least one idler wheel such that the power transmitting element defines a power transmitting element path having an upper element path and a lower element. The at least one idler wheel is positioned such that the lower element path includes at least one point above the frame member.

In an exemplary embodiment, the first sprocket is coupled to the bicycle on the outside of the frame and the second sprocket is coupled to the bicycle on the inside of the frame, wherein the at least one idler wheel is positioned such that the upper and lower element paths cross from outside the frame to inside the frame above the frame member. The bicycle may also include two idler wheels, a first idler wheel positioned adjacent the first sprocket and a second idler wheel positioned adjacent the second sprocket, wherein the portion of the power transmitting element extending between the first and second idler wheels is above the frame member. The portion of the power transmitting element extending between the first and second idler wheels may be generally parallel to a portion of the power transmitting element long the upper element path. In one embodiment, these parallel portions of the power transmitting element may be in a substantially horizontal orientation.

A method of positioning a power transmitting element on a pedaled vehicle having a frame with a first sprocket operatively coupled to a crank and a second sprocket operatively coupled to a wheel of the vehicle, includes providing the power transmitting element in a closed-loop configuration; positioning the closed-loop power transmitting element about the first sprocket of the pedaled vehicle without breaking the closed-loop configuration of the power transmitting element; positioning the closed-loop power transmitting element about the second sprocket of the pedaled vehicle without breaking the closed-loop configuration of the power transmitting element, such that the power transmitting element may be operatively coupled to the pedaled vehicle without breaking the closed-loop configuration of the power transmitting element.

In accordance with the method, the wheel may be coupled to the vehicle after positioning the closed-loop power transmitting element about the second sprocket. The method may also further include engaging the power transmitting element with at least one idler wheel positioned between the first and second sprockets. The power transmitting element defines a power transmitting element path having an upper element path and a lower element path. The method may further include positioning the at least one idler wheel so that the power transmitting element on both the upper and lower element paths cross from outside the frame to inside the frame on the same side of a selected frame member, for example, above a chain stay of a bicycle.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 2:
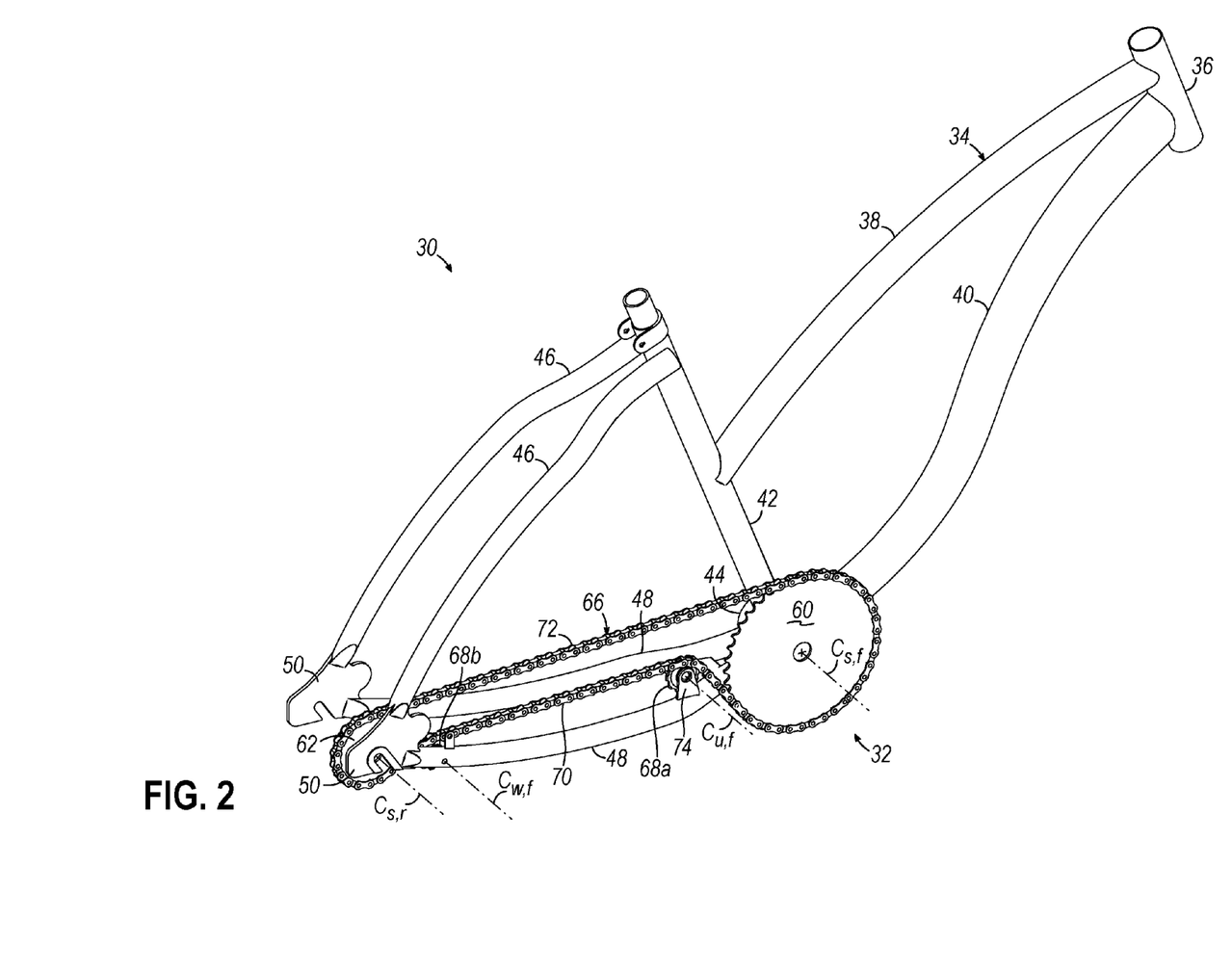
FIG. 2 is a perspective view of a pedaled vehicle having a drive system in accordance with an embodiment of the present invention.
Figure 3:
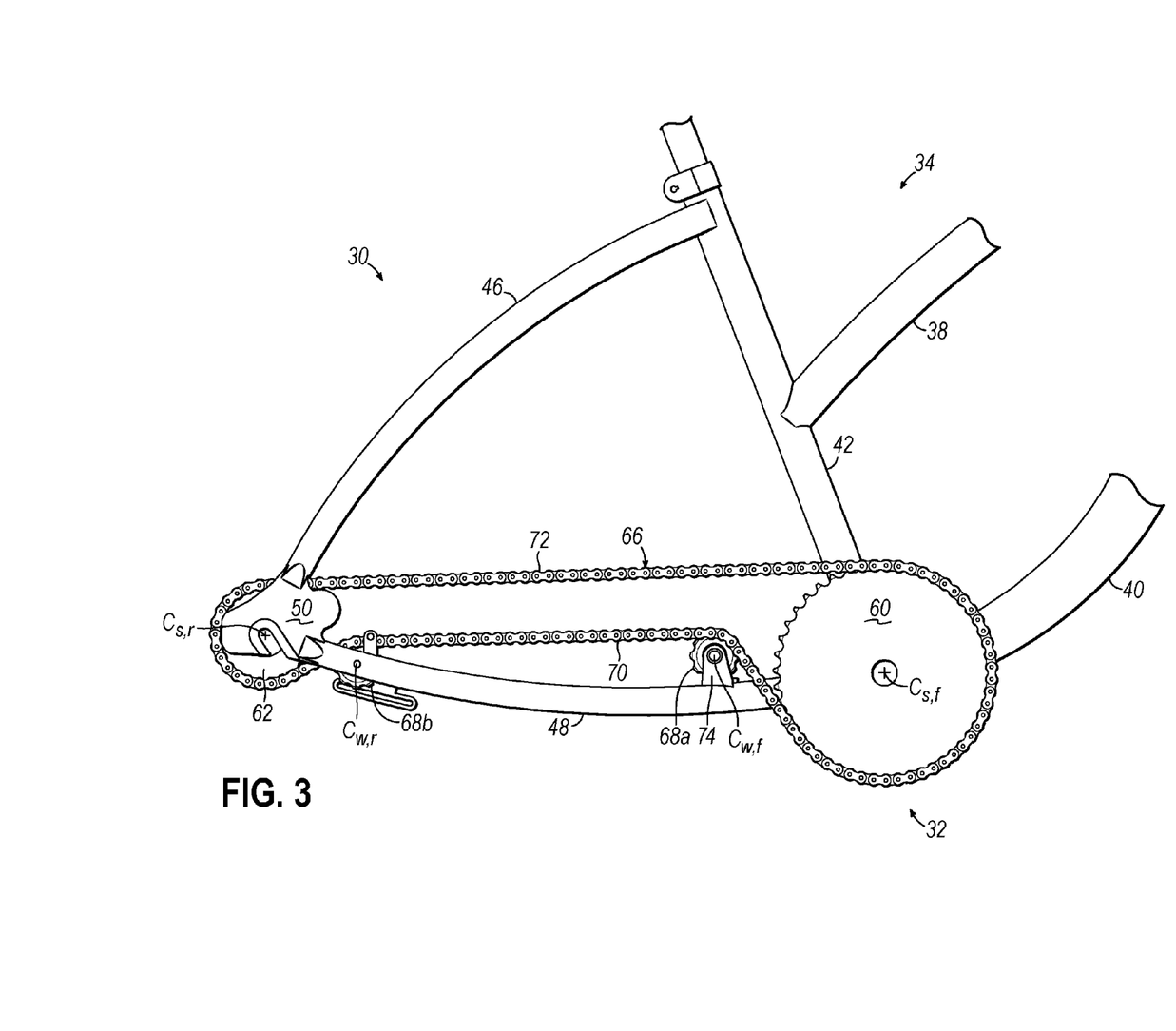
FIG. 3 is a partial side view of the pedaled vehicle shown in FIG. 2.
Figure 4:
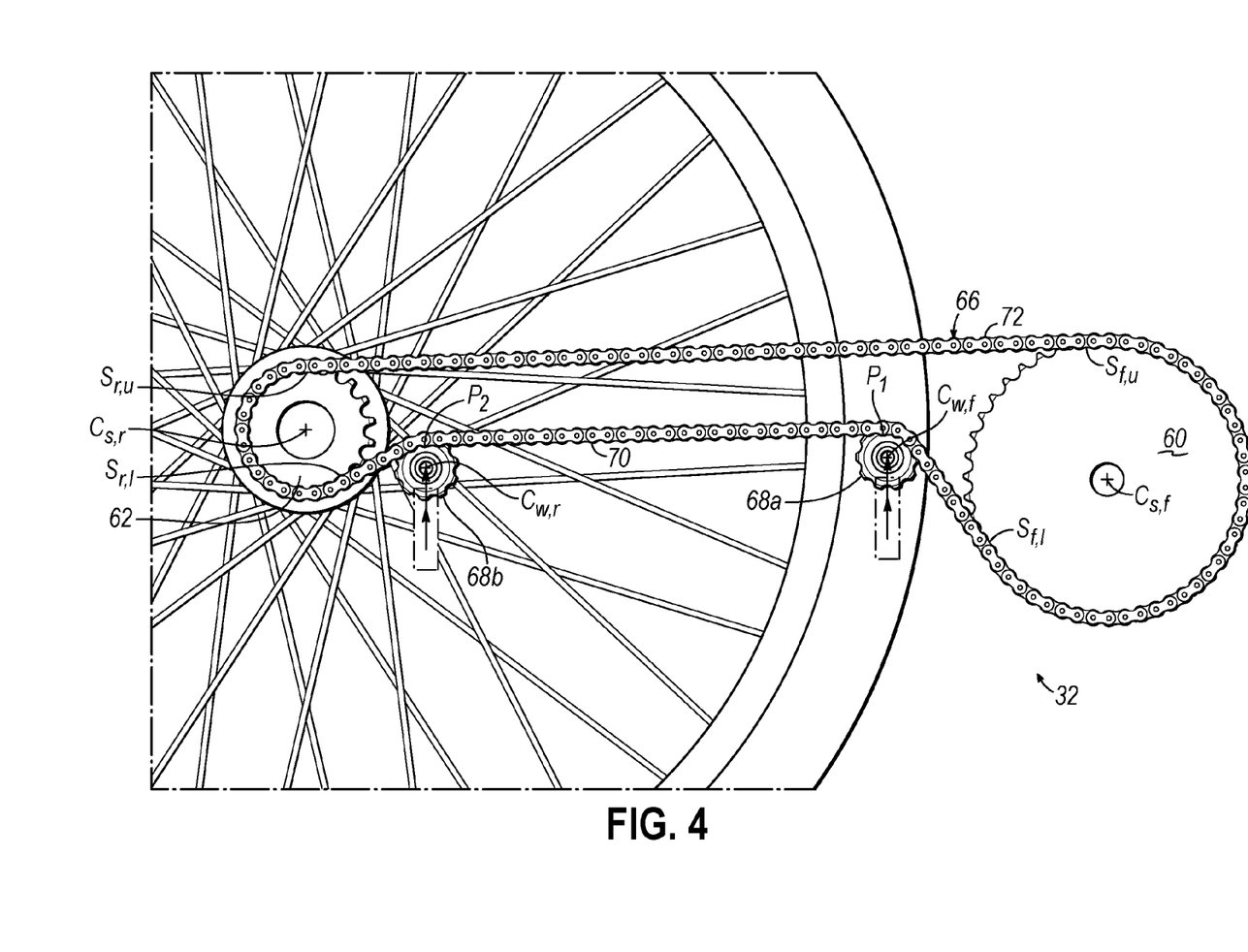
FIG. 4 is a side view of the drive system shown in FIGS. 2 and 3.

Referring now to the drawings and to FIGS. 2-4 in particular, a pedaled vehicle, which in an exemplary embodiment is a bicycle 30, includes a drive system 32 in accordance with an exemplary embodiment of the invention which addresses many of the drawbacks described above. The bicycle 30 includes a frame 34 having a head tube 36, a top tube 38, a down tube 40, a seat tube 42, a bottom bracket 44, a pair of seat stays 46, a pair of chain stays 48, and a pair of rear drop outs 50. Those of ordinary skill in the art will recognize that bicycle 30 may include additional elements, such as the handlebar, front fork, crank arms, pedals, wheels, seat, etc., but these have been omitted for sake of clearly illustrating aspects of the present drive system 32. One of ordinary skill in the art will readily understand how these omitted elements are incorporated into bicycle 30 and their omission does not affect the understanding of the structure or operation of the present invention. Of course, it should be realized that the particular arrangement of the frame 34 may vary from that depicted in FIG. 2 but remain within the scope of the present invention.

In accordance with an exemplary embodiment of the invention, the drive system 32 includes a front sprocket 60 operatively coupled to the crank (e.g., crank arms and pedals, not shown) of the bicycle 30, a rear sprocket 62 operatively coupled to the rear wheel (FIG. 4) of the bicycle 30, and a power transmitting element operatively coupling the front and rear sprockets 60, 62. In an exemplary embodiment, the power transmitting element may include a chain 66. However, as discussed below, one of the benefits of the present invention is that other power transmitting elements, such as belts, ropes, and other closed loop members may be used to transmit power from the crank to the rear wheel of the bicycle 30. The front and rear sprockets 60, 62 are conventionally positioned relative to the frame 34 in that the front sprocket 60 is generally positioned on the outside of the frame 34 and configured to rotate about a central axis $C_f$ while the rear sprocket 62 is generally positioned on the inside of the frame 34, such as between the two chain stays 48, and configured to rotate about a central axis $C_r$ (FIG. 4). In an exemplary embodiment, the front and rear sprockets 60, 62 may include toothed gears, but as mentioned above and discussed below, this may vary depending on the particular power transmitting element implemented with the bicycle 30.

In accordance with an aspect of the invention, the drive system 32 further includes at least one idler wheel 68 coupled to the frame 34 and disposed generally between the front and rear sprockets 60, 62. In an exemplary embodiment, the at least one idler wheel 68 may include a toothed gear, but other configurations, such as a roller or spool may also be possible depending on the particular power transmitting element. The at least one idler wheel 68 is configured to redirect the lower chain path 70, defined as the path the chain 66 takes from lower separation point $S_{f,l}$ of the chain 66 and front sprocket 60 to the lower separation point $S_{r,l}$ of the chain 66 and rear sprocket 62, such that at least one point $P_1$ of the lower chain path 70, which may, for example, be defined at the apex of the idler wheel 68, is positioned above the chain stay 48 which is adjacent the drive system 32.

As noted above, the point $P_1$ is generally disposed between the front and rear sprockets 60, 62, but its position may vary therealong depending on the particular application and the design parameters. Generally, the point $P_1$ may be located between the front and rear sprockets 60, 62 such that the chain 66 may extend between the front sprocket 60 and the idler wheel 68 (e.g., between $S_{f,l}$ and $P_1$) without contacting the chain stay 48. The at least one idler wheel 68 may be further configured to redirect the lower chain path 70 such that at least a portion of the lower chain path 70 rearward of the point $P_1$ is positioned generally inside of the frame 34. More particularly, the at least one idler wheel 68 may be configured such that the chain 66 may extend between the idler wheel 68 and the rear sprocket 62 (e.g., between $P_1$ and $S_{r,l}$) without contacting the chain stay 48.

In this arrangement, and unlike the conventional arrangement shown in FIG. 1, the chain 66 crosses from outside the frame 34 to inside the frame 34 at a location generally above the chain stay 48. Notably, the upper chain path 72, defined as the path the chain 66 takes from upper separation point $S_{r,u}$ of the chain 66 and rear sprocket 62 to the upper separation point $S_{f,u}$ of the chain 66 and front sprocket 60 (FIG. 4), crosses from outside the frame 34 to inside the frame 34 on the same side of the chain stay 48 as the lower chain path 70. In exemplary embodiment, both the lower and upper chain paths 70, 72 cross from outside the frame 34 to inside the frame 34 above the chain stay 48. However, in an alternative embodiment (not shown), both chain paths 70, 72 may cross from outside the frame 34 to inside the frame 34 below the chain stay 48. The inventor believes that having both the lower and upper chain paths 70, 72 cross from outside the frame 34 to inside the frame 34 on the same side of the chain stay 48 is the reason why the chain 66 no longer forms a closed loop about a portion of the frame 34, as will be discussed in more detail below.

In an exemplary embodiment and as illustrated in the figures, the drive system 32 includes two idler wheels 68 generally positioned between the first and second sprockets 60, 62: a first idler wheel 68a adjacent the front sprocket 60 and a second idler wheel 68b adjacent the rear sprocket 62. In alternative embodiments, the drive system 32 may include more or less idler wheels. As noted above, the first idler wheel 68a may be configured as a toothed gear and be coupled to the chain stay 48, via a suitable support or connector 74, such that the first idler wheel 68a is capable of rotating about a central axis $C_{w,f}$. The first idler wheel 68a may be coupled to the chain stay 48 such that the idler wheel 68a is substantially transversely aligned with the first sprocket 60 (e.g., within about +/−5% of perfect alignment), thereby substantially lying within the same plane.

In terms of longitudinal spacing, the first idler wheel 68a may be positioned in the first half of the distance from the first sprocket 60 to the second sprocket 62 (e.g., from 0 to 50% of the distance from the first sprocket 60 to the second sprocket 62). More specifically, the first idler wheel 68a may be positioned within the first quarter of the distance from the first sprocket 60 to the second sprocket 62 (e.g., 0 to 25%). In an exemplary embodiment, the first idler wheel 68a may be positioned within the first 20% of the distance from the first sprocket 60 to the second sprocket 62. These values are merely exemplary, however, as the longitudinal position between the first and second sprockets 60, 62 may vary depending on the particular application.

As mentioned above, the first idler wheel 68a may be coupled to the chain stay 48 such that at least one point of the idler wheel 68a is positioned above the chain stay 48 so as to define the point $P_1$. In one embodiment, for example, the central axis $C_{w,f}$ of the first idler wheel 68a may be positioned above the chain stay 48 and define point $P_1$ at the apex of the idler wheel 68a (which is also above the chain stay 48). Depending on the particular application, the central axis $C_{w,f}$ of the first idler wheel 68a may also be above the central axis $C_f$ of the front sprocket 60. In an alternative embodiment, however, the central axis $C_{w,f}$ of the first idler wheel 68a may not be above the chain stay 48. For example, the central axis $C_{w,f}$ may lie within the vertical thickness of the chain stay 48 (not shown) or even below the chain stay 48 (also not shown). In such embodiments, however, the point $P_1$ at the apex of the idler wheel 68a should be positioned above the chain stay 48.

Similar to the above, the second idler wheel 68b may be configured as a toothed gear and be coupled to the chain stay 48 such that the second idler wheel 68b is capable of rotating about a central axis $C_{w,r}$. The second idler wheel 68b may be coupled to the chain stay 48 such that the idler wheel 68b is substantially transversely aligned with the second sprocket 62 (e.g., within about +/−5% of perfect alignment), thereby substantially lying within the same plane.

As to longitudinal spacing, the second idler wheel 68b may be positioned in the second half of the distance from the first sprocket 60 to the second sprocket 62 (e.g., from 50% to 100% of the distance from the first sprocket 60 to the second sprocket 62). More specifically, the second idler wheel 68b may be positioned within the last quarter of the distance from the first sprocket 60 to the second sprocket 62 (e.g., 75% to 100%). In an exemplary embodiment, the second idler wheel 68b may be positioned within the last 20% of the distance from the first sprocket 60 to the second sprocket 62. These values are merely exemplary, however, as the longitudinal position of the second idler wheel 68b between the first and second sprockets 60, 62 may vary depending on the particular application. In any event, the second idler wheel 68b may be positioned inside of the frame 34, such as between the two chain stays 48, so as to properly align with the rear sprocket 62.

In an exemplary embodiment, the central axis $C_{w,r}$ of the second idler wheel 68b may be positioned within the vertical thickness of the chain stay 48. Depending on the particular application, the central axis $C_{w,r}$ of the second idler wheel 68b may also be below the central axis $C_{s,r}$ of the rear sprocket 62. In an alternative embodiment, however, the central axis $C_{w,r}$ of the second idler wheel 68b may not be within the vertical thickness of the chain stay 48. For example, the central axis $C_{w,r}$ may lie above the chain stay 48 (not shown) or even below the chain stay 48 (also not shown). In these embodiments, a suitable connector may be provided to support the idler wheel 68b relative to the chain stay 48.

In accordance with an exemplary embodiment and as illustrated in FIG. 4, at least one of the idler wheels 68 may be adjustable relative to the frame 34. For example, the adjustability of the at least one idler wheel 68 may be configured to accommodate slack in the chain 66. In one embodiment, the first idler wheel 68a may include a resilient member, such as a spring, which may expand or compress under load to take up slack in the chain 66. In an alternative embodiment, the second idler wheel 68b may be adjustable. In yet a further embodiment, both the front and rear idler wheels 68a, b are adjustable. It should be recognized that other adjusting mechanisms, such as various adjusting pins or tracks may be used to provide an adjustable aspect to one or more of the idler wheels 68.

The arrangement of the sprockets 60, 62 and the idler wheels 68a, 68b provide a chain path in accordance with an aspect of the invention. In this regard and starting at the front sprocket 60, the chain 66 engages the front sprocket 60 at $S_{f,u}$ and wraps around the front sprocket 60 to the point $S_{f,l}$ at which the chain 66 disengages the front sprocket 60. The chain 66 then extends from the point $S_{f,l}$ and engages the upper portion of the first idler wheel 68a to define the point $P_1$ generally at the apex thereof. The chain 66 then extends from the point $P_1$ on the first idler wheel 68a to engage the upper portion of the second idler wheel 68b to define the point $P_2$ generally at the apex thereof. The chain 66 then extends from the point $P_2$ defined by the second idler wheel 68b to the point $S_{r,l}$ at which the chain 66 engages the rear sprocket 62. The portion of the chain path from point $S_{f,l}$ to the point $S_{r,l}$ defines the lower chain path 70. The chain 66 then wraps around the rear sprocket 62 to the point $S_{r,u}$ at which the chain 66 disengages the rear sprocket 62. The chain 66 then extends from the point $S_{r,u}$ on the rear sprocket 62 to the point $S_{f,u}$ on the front sprocket 60 to define the upper chain path 72.

Unlike conventional chain arrangements, such as that shown in FIG. 1, and in accordance with an aspect of the present invention, the chain path as described above does not form a closed loop about the frame 34, and more particularly, the chain stay 48. In other words, no portion of the frame 34 is on the inside or interior of the closed-loop chain 66. In this regard, the chain 66 on the upper chain path 72 crosses from outside the frame 34 to inside the frame 34 above the chain stay 48, as is conventional. However, in accordance with an embodiment of the invention, the chain path has been modified such that the chain 66 on the lower chain path 70 also crosses from outside the frame 34 to inside the frame 34 above the chain stay 48. Since both chain paths 70, 72 cross from outside the frame 34 to the inside of the frame 34 on the same side of the chain stay 48, e.g., above the chain stay 48, the chain 66 does not form a closed loop about the chain stay 48 or other part of the frame 34. Consequently, the chain 66 may be assembled to the bicycle 30 or the chain 66 may be replaced on the bicycle 30 without breaking the chain 66 from its closed-loop configuration or re-establishing its closed-loop configuration. Instead, both of these processes may be achieved with the chain 66 in its closed-loop configuration.

In this regard, an exemplary method for assembling the chain 66 to the bicycle 30 will now be described. In accordance with an aspect of the invention, the chain 66 may already be formed in a closed-loop configuration. Because the chain may be pre-formed in a closed-loop configuration, chains with precise chain lengths may be provided, which may overcome some of the quality assurance issues with current methods. In any event, with the rear wheel, such as the rear axle thereof, disengaged from the rear drop outs 50, the closed loop chain 66 may be positioned around or about the rear sprocket 62. The rear wheel may then positioned in the rear drop outs 50 and secured to the frame 34 (such as, for example, through bolting or quick-release mechanisms). The lower portion of the chain 66 may be threaded over the second idler wheel 68b and possibly the first idler wheel 68a. The chain 66 may then be threaded onto the front sprocket 60, ensuring that as the chain 66 engages the front sprocket 60, such as by turning the crank, the chain 66 also engages the first idler wheel 68a.

Alternatively, with the rear wheel disengaged from the rear drop outs 50 and positioned toward the first sprocket 60, the closed loop chain 66 may be positioned around the rear sprocket 62 and the front sprocket 60 so as to engage the first and second idler wheels 68a, 68b. The rear wheel may then be inserted and rearwardly positioned in the rear drop outs 50 and secured to the frame 34 such that the chain 66 is properly positioned and tensioned. Those of ordinary skill in the art may recognize other methods for positioning the chain 66 on the bicycle 30 and aspects of the invention are not limited to the particular methods described herein. In any event, in accordance with the invention, the chain 66 may be assembled to the bicycle 30 without breaking the initial closed-loop configuration of the chain 66, or re-establishing a closed-loop configuration of the chain to couple the chain to the bicycle 30.

The method for replacing the chain is similar to the above. However, a first step is to remove the old chain, such as by reversing the steps above or breaking the chain, such as with a suitable tool. The new chain may then be coupled to the bicycle in the manner described above. Although not shown in the drawings, if the bicycle 30 includes a chain guard, it may first be necessary to remove the chain guard prior to placing the new chain on the bicycle. The chain guard may also need to be removed prior to removing the old chain, depending on the particular method of removing the old chain. Once the chain has been replaced, the chain guard may be re-connected to the bicycle 30.

The drive system 32 in accordance with the invention provides a number of benefits. First, and as discussed above, aspects of the invention provide for chain assembly or chain replacement without breaking the closed-loop configuration of the chain or re-establishing the closed-loop configuration of the chain. The inventor believes this is due to the fact that no portion of the frame 34 is positioned on the inside of the closed-loop chain 66. The inventor further believes this is due to having both the upper chain path 72 and the lower chain path 70 cross from outside the frame 34 to inside the frame 34 on the same side (e.g., both above) of the chain stay 48. Accordingly, chain designs do not need master links for breaking the closed-loop configuration of the chain, thereby removing the weak link from chain designs and potentially reducing chain failure. Additionally, special tools or the like are not required to replace the chain. Thus, it is expected that consumers will not need to take their bicycles to the shop or incur unnecessary costs in order to replace the chain.

There are additional benefits to being able to assemble or replace a chain without breaking the closed-loop configuration of the chain or re-establishing the closed-loop configuration of the chain. For example, this feature allows the power transmitting element to take on a greater number of forms in addition to a chain. In this regard, various belts are known for transferring power, especially rotary power such as that found on a bicycle. However, while belts are known to be formed in a closed-loop configuration, belts can generally not be broken from that configuration and re-established in the closed-loop configuration, as is necessary in current bicycle drive systems. Hence, heretofore, belt driven bicycles have not been fully developed due to this limitation.

With the ability to assemble and replace the power transmitting element without breakage/re-assembly, however, this limitation has been removed and belt driven pedaled vehicles may now be more fully exploited. Indeed, in an alternative embodiment, the power transmitting element may be configured as a belt, rope, or other continuously closed-loop fiber or material. For example, the power transmitting element may be formed of a continuous piece of plastic material. The belt, rope, etc. may include a plurality of teeth, grooves, or other features that cooperate with teeth, grooves, or other features on the front and rear sprockets to achieve sufficient power transmission from the crank to the rear wheel of the bicycle 30.

Another benefit afforded by the present invention is in regard to reducing the amount of dirt and debris which the chain is subjected to during use. As can been seen in the figures, in an exemplary embodiment, the lower chain path 70 has been raised toward the upper chain path 72 and away from the riding surface of the bicycle 30. Due to the increased distance between the chain and the riding surface, it is believed that the amount of dirt and debris to which the chain is subjected will be reduced. It is further believed that this reduction will, in turn, improve the overall performance of the chain or other power transmitting element.

There may also be an added benefit as a result of raising the lower chain path 70 toward the upper chain path 72. As described above, some countries or regions have regulations that require a chain guard to cover at least a portion of the chain path including the front sprocket, the upper chain path, and in some instances the chain guard must cover the front sprocket and both the upper and lower chain paths. In accordance with the invention, and since the upper and lower chain paths 72, 70 are closer together, a smaller chain guard may be used to cover both chain paths. This, in turn, may reduce the costs associated with providing the chain guard on the bicycle 30. Additionally, since a smaller chain guard may be used, the bicycle aesthetics may be improved.

In a still further embodiment, the drive system 32 as described above may provide for enhanced aesthetics to bicycle 30. In this regard, and as illustrated in the figures, the first and second idler wheels 68a, 68b may be selectively positioned such that a portion 76 of the upper chain path 72 and a portion 78 of the lower chain path 70 may have a generally parallel relationship to each other. The parallel relationship between the lower and upper chain paths 70, 72 should extend over a substantial distance between the first and second sprockets 60, 62. For example, in one embodiment, the parallel relationship may exist for greater than about 25% of the distance between the front and rear sprockets 60, 62; preferably greater than about 50% of the distance between the front and rear sprockets 60, 62; and even more preferably for greater than about 75% of the distance between the front and rear sprockets 60, 62. In addition to the above and by way of example, the portions 76, 78 may be in a substantially horizontal (e.g., +/−5° of horizontal) orientation. It is believed that this arrangement of the lower and upper chain paths 70, 72 (e.g., generally parallel over respective portions and in a substantially horizontal orientation) gives the bicycle 30 a sleek, clean appearance that many consumers will find more appealing. Of course, in alternative embodiments, the parallel portions 76, 78 may have orientations other than substantially horizontal.

Another benefit may be in the design of the front and rear sprockets. As is clearly illustrated in the figures, the chain 66 remains engaged with the front sprocket 60 over an increased distance (e.g., arc length) as compared to the conventional arrangement. For example, in conventional arrangements, the chain 16 initially engages the front sprocket 12 near the top of the sprocket 12 and disengages the front sprocket 12 near the bottom of the sprocket 12, thus engaging the front sprocket 12 over an angle of generally less than about 180°. As illustrated in FIG. 3, however, the chain 66 engages with the front sprocket 60 over an angle greater than about 180°. More particularly, in accordance with an aspect of the invention, the chain 66 engages with the front sprocket 60 over an angle between about 180° and about 270°. More preferably, the chain 66 engages with the front sprocket 60 over an angle between about 185° and about 270°. Even more preferably, the chain 66 engages with the front sprocket 60 over an angle between about 190° and about 270°. In an exemplary embodiment, for example, the chain 66 engages with the front sprocket 60 over an angle of about 265°. The same may also be said of the rear sprocket 62, as is clearly shown in the figures. In any event, because of the increased contact area between the chain 66 and the sprockets 60, 62, the amount of stress imposed on the teeth of the sprockets 60, 62 may be reduced (e.g., the load is spread over a greater area). Accordingly, the sprockets 60, 62 may be made thinner, lighter, or formed from lower strength materials. The greater contact area may also provide improved wear resistance and longevity.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, it should be realized that while aspects of the invention were described with a single front and rear sprocket, in various alternative embodiments, the bicycle may include a plurality of front sprockets and/or a plurality of rear sprockets, such as in multi-speed bicycles. Thus, the various features of the invention may be used alone or in any combination depending on the needs and preferences of the user.

What is claimed is:

1. A pedaled vehicle, comprising:
    a frame having a crank for receiving a power input from a rider;
    a wheel rotatably coupled to the frame; and
    a drive system, comprising:
        a first sprocket operatively coupled to the crank on the outside of the frame;
        a second sprocket operatively coupled to the wheel on the inside of the frame;
        a power transmitting element operatively coupled to the first and second sprockets for transmitting the power input from the rider at the crank to the wheel for moving the pedaled vehicle, the power transmitting element defining a power transmitting element path including an upper element path and a lower element path, the upper and lower element paths crossing from outside the frame to inside the frame on the same side relative to a selected portion of the frame; and
        first and second idler wheels coupled to the frame and configured to engage the power transmitting element, the first idler wheel being adjacent the first sprocket, and the second idler wheel being adjacent the second sprocket and having a rotational center generally below a rotational center of the second sprocket,
    wherein the power transmitting element forms a closed-loop configuration and is arranged relative to the frame such that the power transmitting element is configured to be assembled to the pedaled vehicle or replaced on the pedaled vehicle without having to break the closed-loop configuration of the power transmitting element.

2. The pedaled vehicle according to claim 1, wherein the power transmitting element is coupled to the pedaled vehicle such that no portion of the frame is positioned on the inside of the closed-loop power transmitting element.

3. The pedaled vehicle according to claim 1, wherein the first and second idler wheels engage the power transmitting element along the lower element path.

4. The pedaled vehicle according to claim 1, wherein the first idler wheel has a rotational center generally above a rotational center of the first sprocket.

5. The pedaled vehicle according to claim 1, wherein the first idler wheel is positioned within the first 20% of the distance between the first and second sprockets.

6. The pedaled vehicle according to claim 1, wherein the first idler wheel is adjustable relative to the frame.

7. The pedaled vehicle according to claim 1, wherein the second idler wheel is positioned within the last 20% of the distance between the first and second sprockets.

8. The pedaled vehicle according to claim 1, wherein the second idler wheel is adjustable relative to the frame.

9. The pedaled vehicle according to claim 1, wherein the power transmitting element extending between the first and second idler wheels defines a first element path portion on one of the upper or lower element paths, wherein the first element path portion is generally parallel to a second element path portion on the other of the upper or lower element paths.

10. The pedaled vehicle according to claim 9, wherein the generally parallel first and second element path portions extend for greater than about 50% of the distance between first and second sprockets.

11. The pedaled vehicle according to claim 9, wherein the generally parallel first and second element path portions are oriented substantially horizontally.

12. The pedaled vehicle according to claim 1, wherein the first idler wheel is positioned such that the power transmitting element engages the first sprocket over an angle greater than about 180°.

13. The pedaled vehicle according to claim 12, wherein the power transmitting element engages the first sprocket over an angle between about 185° and about 270°.

14. The pedaled vehicle according to claim 1, wherein the second idler wheel is positioned such that the power transmitting element engages the second sprocket over an angle greater than about 180°.

15. The pedaled vehicle according to claim 1, wherein the selected portion of the frame is a chain stay and the upper and lower element paths cross from outside the frame to inside the frame generally above the chain stay.

16. The pedaled vehicle according to claim 1, wherein the pedaled vehicle is configured as a bicycle.

17. The pedaled vehicle according to claim 1, wherein the power transmitting element includes a chain or a belt.

18. The pedaled vehicle according to claim 1, wherein a portion of the power transmitting element extending between the first and second idler wheels is above the selected portion of the frame.

19. A method of positioning a power transmitting element on a pedaled vehicle having a frame with a first sprocket operatively coupled to a crank on the outside of the frame and a second sprocket operatively coupled to a wheel of the pedaled vehicle on the inside of the frame, the method comprising:
    providing the power transmitting element in a closed-loop configuration;
    positioning the closed-loop power transmitting element about the first sprocket of the pedaled vehicle without breaking the closed-loop configuration of the power transmitting element; and
    positioning the closed-loop power transmitting element about the second sprocket of the pedaled vehicle without breaking the closed-loop configuration of the power transmitting element,
    positioning the closed-loop power transmitting element about a first idler wheel adjacent the first sprocket of the pedaled vehicle without breaking the closed-loop configuration of the power transmitting element, positioning the closed-loop power transmitting element about a second idler wheel adjacent the second sprocket of the pedaled vehicle without breaking the closed-loop configuration of the power transmitting element, the second idler wheel having a rotational center generally below a rotational center of the second sprocket, wherein the power transmitting element defines a power transmitting element path including an upper element path and a lower element path, the upper and lower element paths crossing from outside the frame to inside the frame on the same side relative to a selected portion of the frame, so as to operatively couple the power transmitting element to the pedaled vehicle without breaking the closed-loop configuration of the power transmitting element.

20. The method according to claim 19, further comprising coupling the wheel to the pedaled vehicle after positioning the closed-loop power transmitting element about the second sprocket.

21. The method according to claim 19, wherein the first and second idler wheels engage the power transmitting element along the lower element path.

22. The method according to claim 19, wherein the frame has a pair of rear drop outs, the method further comprises:
previously disengaging a rear wheel from the pair of rear drop outs.

23. The method according to claim 19, wherein positioning the closed-loop power transmitting element about a first idler wheel adjacent the first sprocket of the pedaled vehicle without breaking the closed-loop configuration of the power transmitting element, further comprises:
positioning the closed-loop power transmitting element about a first idler wheel adjacent the first sprocket of the pedaled vehicle without breaking the closed-loop configuration of the power transmitting element, the first idler wheel having a rotational center generally above a rotational center of the first sprocket.

24. The method according to claim 19, wherein positioning the closed-loop power transmitting element about a first idler wheel adjacent the first sprocket of the pedaled vehicle without breaking the closed-loop configuration of the power transmitting element, further comprises:
positioning the closed-loop power transmitting element about a first idler wheel that is within the first 20% of the distance between the first and second sprocket and adjacent the first sprocket of the pedaled vehicle without breaking the closed-loop configuration of the power transmitting element.

25. The method according to claim 19, wherein positioning the closed-loop power transmitting element about a second idler wheel adjacent the second sprocket of the pedaled vehicle without breaking the closed-loop configuration of the power transmitting element, the second idler wheel having a rotational center generally below a rotational center of the second sprocket, further comprises:
positioning the closed-loop power transmitting element about a second idler wheel that is within the last 20% of the distance between the first and second sprocket and adjacent the second sprocket of the pedaled vehicle without breaking the closed-loop configuration of the power transmitting element, the second idler wheel having a rotational center generally below a rotational center of the second sprocket.

26. The method according to claim 19, wherein positioning the closed-loop power transmitting element about a second idler wheel adjacent the second sprocket of the pedaled vehicle without breaking the closed-loop configuration of the power transmitting element, the second idler wheel having a rotational center generally below a rotational center of the second sprocket, further comprises:
positioning the closed-loop power transmitting element about a second idler wheel adjacent the second sprocket of the pedaled vehicle without breaking the closed-loop configuration of the power transmitting element, the second idler wheel having a rotational center generally below a rotational center of the second sprocket and is adjustable relative to the frame.

27. The method according to claim 19, wherein the power transmitting element extending between the first and second idler wheels defines a first element path portion on one of the upper or lower element paths, wherein the first element path portion is generally parallel to a second element path portion on the other of the upper or lower element paths.

28. The method according to claim 27, wherein the generally parallel first and second element path portions extend for greater than about 50% of the distance between first and second sprockets.

29. The method according to claim 27, wherein the generally parallel first and second element path portions are oriented substantially horizontally.

30. The method according to claim 19, wherein positioning the closed-loop power transmitting element about a first idler wheel adjacent the first sprocket of the pedaled vehicle without breaking the closed-loop configuration of the power transmitting element, further comprises:
positioning the closed-loop power transmitting element about a first idler wheel adjacent the first sprocket of the pedaled vehicle without breaking the closed-loop configuration of the power transmitting element, such that the first idler wheel allows the power transmitting element to engage the first sprocket over an angle greater than about 180°.

* * * * *